United States Patent [19]
Johnston, Jr.

[11] 3,724,953
[45] Apr. 3, 1973

[54] OPTICAL ALIGNMENT DEVICE PROVIDING A VIRTUAL PIVOTING LASER BEAM

[75] Inventor: Thomas F. Johnston, Jr., Ithaca, N.Y.

[73] Assignee: Lansing Research Corporation, Ithaca, N.Y.

[22] Filed: Feb. 7, 1972

[21] Appl. No.: 224,036

[52] U.S. Cl. ..................356/153, 350/6, 350/285
[51] Int. Cl. .............................................G01b 11/26
[58] Field of Search ...................356/153; 350/285, 6

[56] References Cited

UNITED STATES PATENTS

| | | | |
|---|---|---|---|
| 766,355 | 8/1904 | Hulsmeyer | 350/285 |
| 2,034,583 | 3/1936 | Koch | 350/6 |
| 3,331,651 | 7/1967 | Sterzer | 350/96 |
| 3,499,713 | 3/1970 | Ito | 356/138 |
| 3,506,779 | 4/1970 | Borwn et al. | 350/6 |
| 3,544,200 | 12/1970 | Boll | 350/285 |
| 3,549,733 | 12/1970 | Caddell | 350/6 |
| 3,666,360 | 5/1972 | Mills et al. | 356/120 |
| 3,516,743 | 6/1970 | McKown | 350/6 |

FOREIGN PATENTS OR APPLICATIONS

| | | | |
|---|---|---|---|
| 1,124,967 | 8/1968 | Great Britain | 350/6 |

*Primary Examiner*—Ronald L. Wibert
*Assistant Examiner*—J. Rothenberg
*Attorney*—Jennings Bailey, Jr.

[57] ABSTRACT

A device, which incorporates a laser producing a beam useful in orienting optical elements, includes a pivoting mirror mounted for rotational adjustment at the point of intersection (the real pivot point) of two intersecting, orthogonal, rotational axes. The beam from the laser passes through a first lens (used for control of the spreading of the beam) and impinges on the mirror at the real pivot point. The reflected beam emerges from this stationary pivot point at a variable angle as rotational adjustments to the mirror are made. The reflected beam passes through a second (output) lens, which forms an image, the virtual pivot point, of the real pivot point at a distance in front of the output lens given by the lens maker's formula. The stationariness of the beam at the real pivot point is transferred to its image, the virtual pivot point, where the input aperture of the optical system to be aligned is located. This makes it possible to vary the angle of the beam as desired in putting the beam along the optical axis of the system being aligned, while the beam always passes through the virtual pivot point. Adjustments are also provided in the device for positioning the virtual pivot point on the system input aperture, by focussing the output lens (for bringing the virtual pivot into the plane of the input aperture, along the beam direction) and by adjustments in height and lateral position, for centering the virtual pivot transversely, in the plane of the input aperture.

16 Claims, 4 Drawing Figures

OPTICAL ALIGNMENT DEVICE PROVIDING A VIRTUAL PIVOTING LASER BEAM

BACKGROUND OF THE INVENTION

1. Field of the Invention

The invention relates to a device for aligning optical systems which provides a ray whose angle can be changed while always passing through a single point at the entrance aperture of the system being aligned.

This device makes it easy to put the beam of a laser along any desired optical axis defined by an entrance pupil and an exit pupil fixed in space, a given distance apart.

2. The Prior Art

In the conventional use of a laser for optical alignment, the laser supplying the beam is moved about to try to make the beam pass through both pupils. This is difficult because adjustments made to make the beam direction parallel to the optical axis usually tend to move the beam off the entrance aperture.

A typical use of a laser aligner is to align the resonator mirrors for a gas laser. The procedure is to pass the alignment beam down the center of the gas laser discharge tube, obtaining a clean transmitted beam. The mirror on the opposite side of the tube is then aligned by reflecting the beam back on itself. Often, the near mirror is then inserted in place and aligned similarly with its return reflection — not as accurate a procedure as for the far mirror, because the beam enters the near mirror from the rear and the mirror wedge angle alters the angle of incidence on the front surface. The tube is then lit, and the near mirror angular adjustments are walked until (hopefully) the discharge tube and mirror pair comprising the optical system being aligned begins to function as a laser itself.

Returning the beam upon itself is no problem; the difficult part is centering the beam initially down the tube bore. A one- or two-bounce grazing incidence reflection off the inner tube wall can give a bright, small spot of transmitted light. To distinguish this from a straight-through beam, the input angle is varied to be sure that the spot moves in the correct direction and at the right rate (an odd number of stray reflections reverses the sense of motion; and as any reflected ray path is longer than the straight through path, the spot moves at a faster rate when reflected) and that the transmitted patterns seen are symmetrical on either side of the best alignment position. This is awkward at best with a conventional alignment laser mounting, because reproducible variations of the input angle are difficult to obtain, and changing the angle of incidence also varies the point of entrance into the tube which by itself alters the transmitted light pattern.

Several types of mechanical devices are available to aid in pointing an alignment laser. Some of the representative types are as follows: The twin-ring, or six-point mount is borrowed from its traditional use in mounting a finder telescope. Four lower screws are used to translate or adjust the angle of the cylindrical laser head, and two top screws clamp it in place after adjustment.

Another mount used with a cylindrical laser head consists of four metal cones threaded into a base plate; the head is placed into the two V-notches formed by the sides of the cones and may be tilted or translated by turning the cones into or out of their base. The laser head is usually retained by a rubber strap running over the top of the head, attached to the base at the two ends of the strap.

A third type of adjustable laser head mount provides a means of both vertical and horizontal translation at both the front and rear ends of the head. A simple means of doing this is by attaching the laser head to a mounting bar containing leveling screws (for vertical adjustments). The bar fits into a base having horizontal screws that push the bar against spring loaded plungers. Tilt is provided by working the screw adjustments on one end alone; translation of the beam by working both ends together.

As a fourth example of a laser beam pointer, there may be used two quasi-parallel mirrors mounted on a common plate, with the mirrors placed to intercept the laser beam and reflect the beam between them in a Z pattern. By rotating the mirror plate (in either a vertical or horizontal plane) translation of the beam is accomplished. Angular deflection of the beam (horizontally or vertically) is obtained by tilting the plane of the second mirror only.

All of the examples of prior art discussed are capable of giving precise, controlled beam displacements and angular changes. Their main disadvantage is that these two types of adjustments interfere with each other. A tilt adjustment displaces the beam off the entrance aperture, and requires a compensating translation adjustment. The process of aligning the beam through the entrance and exit apertures then becomes an iterative sequence of tilt and displacement adjustments, and it may be difficult to make the sequence converge to a centered "best alignment" condition. The type of adjustments for directing a laser beam available in the prior art do not allow the centering of the beam in the entrance aperture to be made independently of the centering of the beam in exit aperture.

Also, the entrance and exit apertures are often not simple holes in two plates, but might be, for example the beginning and end of the small-bore section of a glass, gas-discharge tube (laser tube). The light transmitted through the tube in aligning the beam in this case consists of light reflected or scattered off the tube walls, as well as the directly transmitted light. An excellent way to be assured that the beam is centered down the tube bore, in this case, is to perturb the beam adjustment (in either tilt or displacement) around its "best alignment" position to check that the patterns made by the transmitted beam change symmetrically for symmetrical adjustments to either side of the "centered" beam adjustment. However, with the types of adjustments available in the prior art, this process of walking the beam to check its centering is often difficult for two reasons. First, any single adjustment results in a large change in the transmitted light pattern, because the beam moves off the entrance aperture. Second, coupled adjustments which are necessary to keep the beam on the entrance aperture, where a tilt and translation adjustment are made simultaneously, are difficult to make reproducible. Hence it is hard to come back to a setting, once it is found that perturbations from it produce symmetrical transmitted light patterns.

A third disadvantage of the prior art is that the alignment laser beam is used just as it comes out of the laser, without reduction of the frequently large beam divergences found in commercial alignment lasers. The divergence angle of a laser beam is proportional to the inverse of the beam diameter at the focal plane of the beam [See, for example, H. Kogelnik and T. Li, *Applied Optics* 5 (Oct. '66) pp. 1550–1567, "Laser Beams and Resonators", eq. (22) ] while the alignment laser tube diameter (which determines the beam diameter) is restricted to rather small diameters (frequently 1 mm I.D.) by considerations for maximizing the output power from a short laser tube (see, e.g., P.W. Smith, "On the Optimum Geometry of a 6328 A. Laser Oscillator," IEEE J. Quantum Electronics, 2, (April '66) p. 77–79). A useful way of describing the divergence of a laser beam is to give the Rayleigh range of the beam; this is the propagation distance away from the beam waist (the beam focal plane, where the transverse dimension of the beam is a minimum) that it takes for the beam to spread to twice the area it had at the waist (the beam diameter goes up by a factor of $\sqrt{2}$). A typical commercial alignment laser (Spectra-Physics Model 132) has a Rayleigh range of only 0.8 m, with a typical optical system with which this laser might be used, a Rayleigh range of 2 m would be desirable. To enlarge the beam diameter and decrease its divergence, the beam may be passed through a telescope (a pair of lenses spaced by the sum of their focal lengths, with the beam entering the shorter-focal-length lens first). Such a telescope represents an expensive, inconvenient accessory to alignment devices in the prior art, but is an automatic part of the present invention.

SUMMARY OF THE INVENTION

The invention includes a pivoting mirror, mounted for pure rotational movement at the intersection of two orthogonal, intersecting, rotational axes, called the real pivot point. The input beam from the laser strikes this mirror at the real pivot point, and the reflected beam emerges from this stationary pivot point at a variable angle as rotational adjustments to the mirror are made. The reflected beam passes through an output lens, which forms an image, the virtual pivot point, of the real pivot point at a distance in front of the output lens given by the lens maker's formula. The stationariness of the beam at the real pivot point is transferred to its image, the virtual pivot point, where the input aperture of the system being aligned is located. Only the angle of the beam through the virtual pivot point changes as pivoting mirror adjustments are made.

The angle of spreading of a laser beam (the beam divergence) is altered when it is passed through a lens; the spread angle of the beam emerging from the output lens is controlled by inserting a lens, the divergence correction lens, into the input beam, before it strikes the pivoting mirror, at a distance in back of the output lens equal to the sum of the focal lengths of the two lenses. This lens pair forms a telescope which transmits the laser beam with minimum divergence. Also, a magnification of the output beam diameter (with a corresponding reduction in the minimum beam divergence) may be obtained, if desired, by choosing the focal length of the divergence correction lens to be less than the focal length of the output lens. To vary the throw distance of the virtual pivot point away from the output lens (as an aid in locating the virtual pivot point at the optical system input aperture) the lens is mounted in a focusing housing which allows the distance from the output lens to the real pivot to be varied. This varies the throw distance, according to the lens maker's formula. In focusing, the divergence correction lens is coupled with the output lens to maintain the telescope condition, and minimum output beam divergence. The whole apparatus (laser, lenses and mirror) is mounted on a common base which has height and lateral positioning adjustments for centering the virtual pivot point on the system input aperture in the two dimensions transverse to the beam axis. For convenience in constructing the device, plane mirrors may be used to fold the path of the laser beam as desired.

The virtual pivot alignment device solves the problem of pointing a laser beam through an optical system defined by an entrance and exit aperture a given distance apart by providing a means for adjusting the beam direction while simultaneously insuring that the beam continues to pass through a fixed, remote point in space — the virtual pivot. Alignment of the beam to the system is rapidly done by first positioning the virtual pivot on the entrance aperture, and then adjusting the beam direction to pass the beam through the exit aperture.

The present invention also solves the problem of non-reproducibility of the input angle by decoupling the adjustments which determine the input angle from those which determine the point of entry into the tube. Aside from being much more convenient, this also allows the centering to be done with greater precision because an accurately symmetrical sequence of transmitted patterns can be found.

A typical optical system where the device would be used would be that encountered in aligning a gas laser — here the entrance and exit pupils could be about 2 mm in diameter, separated by a 1 meter distance. Hence the horizontal and vertical positioning of the virtual pivot should have a resolution of at least ½ mm, and the pivoting angle a resolution of at least 1 milliradian. Also, to accommodate the wide variety of physical sizes of optical systems, the distance from the output end of the alignment device to the virtual pivot should be variable from about 25 cm to 1 meter, with a resolution of 0.2 cm to insure that the virtual pivot is well located at the entrance pupil.

DESCRIPTION OF THE PREFERRED EMBODIMENTS

Figure 1:
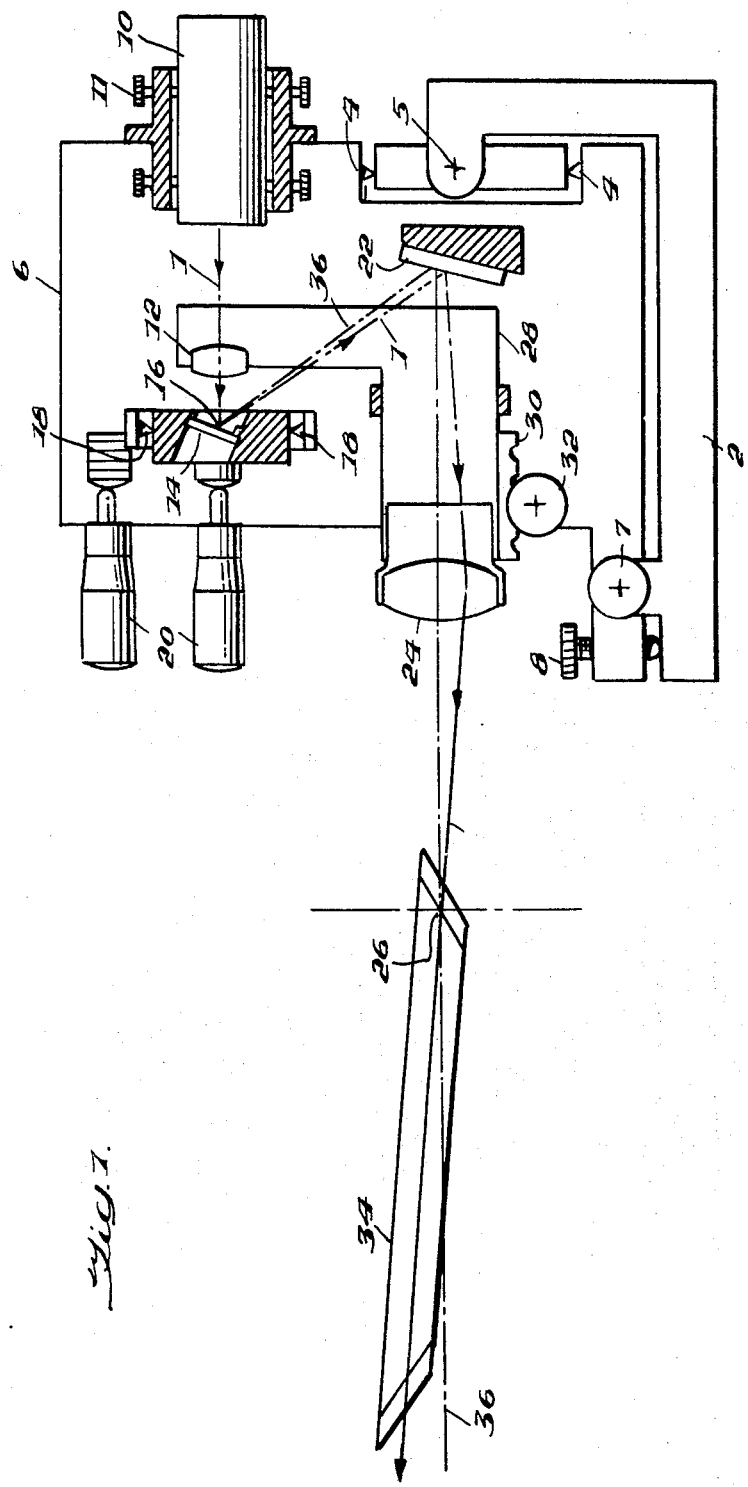
FIG. 1 shows diagrammatically a virtual pivot alignment device according to the invention.

Referring now to FIG. 1, the path of the laser beam through the device is indicated by the ray 1. It will be noted that in FIG. 1 this ray forms a Z pattern in traversing the device; this is not necessary for the functioning of the device, and this ray could be laid out in an L or U shape, for example, as desired in shaping the external package of the device. The necessary requirement is that the path length followed by the ray between the divergence correction lens 12 and the output lens 24 be held constant, and equal to the sum of the focal lengths of the lenses 12 and 24, while the distance between the output lens 24 and the mirror 14 is varied in focusing the lens 24. This is accomplished in the figure by attaching the two lenses to a rigid member, the frame 28. The interlens distance remains constant, then, if the two lenses are placed in parallel rays which both move in the same direction, hence the Z configuration. In other configurations, geared tracks or belt drives, for example, might be used to hold the interlens distance constant as the lens 24 is focused. For simplicity however, the description below is restricted to the Z configuration.

Referring once again to FIG. 1, there is a base 2 on which is pivoted at 4 and 5 a frame 6. The frame may be adjusted about the vertical axis 4 by a screw arrangement 7 and about the horizontal axis by a screw arrangement 8.

The frame 6 carries a laser 10, the output beam 1 of which enters a divergence correction lens 12 and is reflected by a plane mirror 14 mounted for movement about two intersecting axes of rotation at right angles to each other. The mirror mounting is indicated diagrammatically by the axes 16, 18 and the micrometers 20, and the mounting may be for example of the type shown in the Wolga U.S. Pat. No. 3,289,311. The front surface of the mirror 14 contains the point of intersection of the axes 16, 18; this point being called the real pivot point. The lens 12 is mounted so that its axis intersects the real pivot point. The mounting of the laser 10 to the frame 6 includes a means of adjustment 11 of the direction and position of the beam 1 emerging from the laser, so that this emerging beam may be made accurately coincident with the axis of the lens 12, and thus the beam strikes the mirror 14 with the beam center accurately located at the real pivot point regardless of the motion of the lens 12 along its axis. The reflecting surface of the mirror 14 is at an angle substantially different from a right angle to the direction of the incoming ray 1, so that the reflected beam is not intercepted by the lens 12. In the Z configuration, the frame 6 also carries a second plane mirror 22., the surface of which is in the line of rays passing through the lens 12 and reflected from the mirror 14, and its reflecting surface is substantially parallel to that of mirror 14 when the pivoting mirror 14 is adjusted to the middle of its range of motion. The beam reflected by the mirror 22 passes to an output lens 24, and from that to a virtual pivot point 26 to be described below. The lens 24 is mounted so that its axis, when reflected in the plane mirror 22, intersects the real pivot point. The axes of the two lenses 12, 24 are parallel. The optical path length along the beam direction between the two lenses is normally adjusted to equal the sum of the focal lengths of the two lenses, in order for the divergence, or spreading angle, of the beam emerging from the output lens 24 be a minimum as described below.

The lenses 12 and 24 are mounted in a common frame 28 which is movably mounted in the frame 6, and can be adjusted in the direction parallel to the axes of the two lenses by a focusing mechanism, indicated diagrammatically in FIG. 1 by a rack 30 carried by the frame 28 and a cooperating pinion 32. Lens 24 is also mounted for sliding adjustment in the frame 28, for example in the manner of a telescope lens, so that if desired the relative positions of the lenses 12 and 24 can be adjusted. Normally, however, the two lenses move together by movement of the frame 28. The optical system to which the beam 1 is being aligned is represented in the figure by the laser discharge tube 34. Not shown in the figure is a throw distance scale consisting of a pointer mounted on the frame 28 which indicates against a scale mounted on the frame 6 the distance of the virtual pivot point 26 away from some designated point on the device. Also, in using the reflection of the ray 1 off some optical element to orient the element, it is convenient to include in the device a movable aperture which may be placed in front of the lens 24 in a position to transmit the beam, to provide a place to view the beam reflected off the optical element.

The operation of the device will now be explained. The laser beam is directed through the divergence correction lens 12 onto the pivot point of a gimbaled mirror mount 14.

The plane pivoting mirror 14 directs the beam onto the plane folding mirror 22, and out through the output lens 24. The lens 24 forms an image (the virtual pivot point), at a distance to the left of 24 given by the lens maker's formula, of the (real) pivot point of the gimbaled mirror. The real pivot point is stationary as the gimbal mirror mount is adjusted and only the direction of the beam emerging from the pivoting mirror changes. The same is true of the image of the pivot point — this provides the virtual pivoting action of the output beam described above. The output beam always intersects the virtual pivot point as the gimbal adjustments are varied, only the direction of the beam in going through the virtual pivot changes.

The procedure for use of the device is as follows: First, the pivot projection distance is set equal to the lens 24 — entrance aperture distance by focusing 24. A correct setting may be made by measuring the lens 24 — aperture distance, and using a calibrated scale provided in the focusing housing. Alternately, the output beam spot may be observed on the entrance aperture, or on a card placed in the plane of the entrance aperture, while a rocking motion is applied to the beam direction (using one of the gimbal adjustments) while 24 is slowly focused. The correct focus is indicated by the spot on the card, which initially walks back and forth, becoming stationary (even though the gimbal adjustment is still being rocked) at the correct focus setting.

The transverse virtual pivot position adjustments 7, 8 are next used to center the virtual pivot point in the entrance aperture. Finally, the gimbal angular adjustments are varied to center the beam in the exit aperture, and to walk the beam around the "best alignment" setting to check for a symmetrical set of transmitted patterns. Since the laser discharge tube 34 representing the optical system to which the beam is being aligned is shown cocked off the optical centerline 36 in the figure, the ray 1 representing the "best alignment" to the optical system also deviates from the centerline 36. In the case where the optical system being aligned is a long narrow glass tube such as 34, generally the transmitted light pattern is in the form of a narrow ring (with a dark center), caused by a specular reflection off the cylindrical tube wall at grazing angles of incidence. It is found here that final alignment is trivially accomplished by varying at first only one gimbal angular adjustment. The diameter of the transmitted ring pattern will go through a minimum (corresponding to the minimum incidence angle that adjustment alone can give). Once this minimum ring diameter is obtained, this first adjustment is left set at the minimum, and the other gimbal adjustment is then varied to reduce the ring diameter further until the ring collapses to give the full, straight through (no reflections) transmitted alignment spot. The beam is now aligned to the tube axis. No iterative procedure is required in this example, merely successive, distinct steps — a distinct advantage over the procedures required in the prior art. The problems of centering the beam in each of the entrance and exit apertures have been separated, and made uncoupled, by use of the invention.

Figure 2:
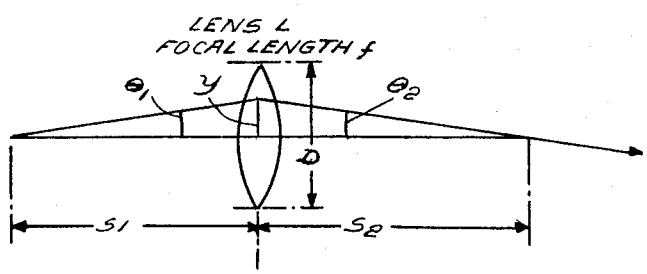
FIGS. 2, 3 and 4 are explanatory diagrams.

Reasonable values of the lens focal lengths and diameters may be obtained as follows: The distance $s_2$ that the virtual pivot is projected away from the lens 24 (of focal length $f$) is given by the lens maker's formula (noting throughout that the beam may be folded by reflection from the plane pivoting or folding mirror without affecting the focusing properties of the lenses) as $$1/s_2 = 1/f - 1/s_1 \quad (1)$$

where $s_1$ is the distance from the lens to the real pivot (see FIG. 2). Note that from eq. (1) $s_2 = s_1$ for $s_1 = 2f$. From FIG. 2 (using the approximation of small angles) the output angle of the beam $\theta_2$ is related to the input angle $\theta_1$ (the entrance height on the lens being $y$), by $$\theta_2 = y/s_2, \theta_1 = y/s_1; \theta_2/\theta_1 = s_1/s_2. \quad (2)$$

It is desirable that the reduction of the angular range of the output beam over that of the input beam be not too great, in order that the resolution requirements for adjustments of the mechanical mirror mount holding the pivoting mirror 14 do not become excessive. Hence the approximate requirement $\theta_2 = \theta_1$ which implies $s_2 = s_1 = 2f$. Therefore, to get a reasonable throw distance (25 cm) there results $f = 10$ to 15 cm, and to get a reasonable range of input angles of $\theta_1 = 5°$ that the lens 24 will accept there results a lens diameter $D = 4f\theta_1 = 5$ cm. A more detailed analysis, which includes considerations of maximizing the range of throw distances $s_2$ available, while minimizing the length of travel that must be built into the focusing frame 28, with allowance made for expansion of the beam diameter (discussed below), leads to the results $s_{1max} = 1.6 f$ and that the focal length and lens diameter deduced by the simple argument above are still reasonable.

Figure 3:
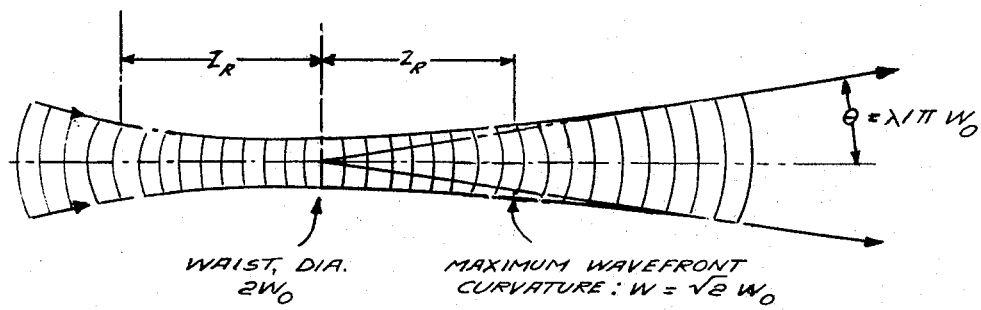

The output beam size and divergence is controlled by the focal lengths and relative placement of the lens pair 12,24. The propagation of Gaussian (laser) beams is analyzed in H. Kogelnik and T. Li, Appl. Optics 5 (Oct. '66) 1550–1567, "Laser Beams and Resonators" and H. Kogelnik, Bell Sys. Tech. J. 44 (March '65) 455–494, "Imaging of Optical Modes — Resonators with Internal Lenses", with the result shown in FIG. 3. The beam has a waist, a point of minimum diameter $2w_o$ where the wavefront is plane, and propagates away from the waist with a far-field diffraction half-angle $\theta = \lambda/\pi w_o$, where $\lambda$ is the wavelength of the laser beam. At a distance $z_R = \pi w_o^2/\lambda$ (called the Rayleigh range)

away from the waist the beam area has increased by a factor of two (the beam diameter by $\sqrt{2}$) and reached the point of maximum wavefront curvature. Thus the beam diameter and divergence are tied directly together. A good alignment beam, to be useful, should stay esentially parallel (within the Rayleigh range) for $z_R = 2$ meters. This implies $2w_o = 1.26$ mm at $\lambda = 632.8$ nm, the wavelength of the low power commercial lasers conventionally used for alignment purposes. Many such alignment lasers have a smaller diameter output beam (for example, the Spectra-Physics model 132 has $2w_o = 0.8$ mm) because of other constraints on the tube diameter which limit the output beam diameter. For a waist diameter of 0.8 mm, there results a range $z_R = 0.8$ meters, which is not really long enough. Therefore it is desirable to use the lens arrangement to enlarge the output spot over the input spot size.

Figure 4:
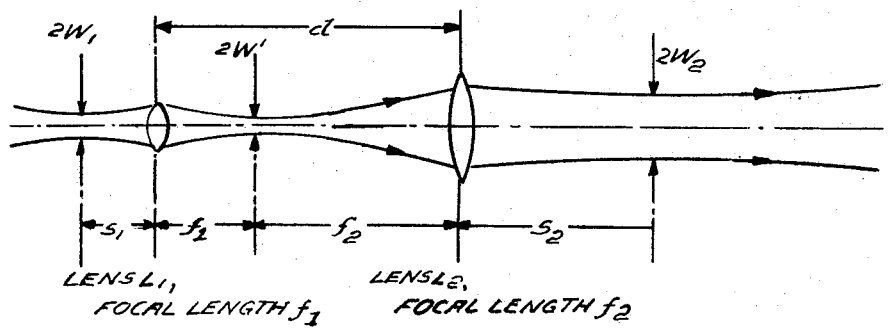

To explain the beam enlargement properties of the lens pair 12, 24, it is convenient to first explain the action of a single lens on a laser beam, and why it is necessary to have two lenses in the device. The transformation properties of a Gaussian beam when passed through a lens are discussed in Appl. Optics 5, 1550–1567, supra. As the distance $s_1$ between the lens and the input beam waist is varied through $s_1 = f$, the Rayleigh range of the output beam $z_{R2}$ goes through its maximum value of $z_{R2} = 2f^2/z_{R1}$, where $z_{R1}$ is the Rayleigh range of the input beam. Thus to have a nearly parallel output beam (large $z_{R2}$) for a given lens focal length $f$, a very divergent input beam (small $z_{R1}$) is required. For $z_{R1} = 0.8$ m (the Spectra-Physics laser), and the previously determined $f = 15$ cm, there results $z_{R2} = 5.6$ cm. This is much too small a range to make a useful alignment beam. Thus two lenses are needed, the first one to transform the alignment beam from the laser into a beam with a small Rayleigh range, to act an an input for the second lens (which also forms the virtual pivot by imaging the real pivot) giving an output range $z_{R2} = 2$ meters. Since the output waist of the first lens is to fall in the focal plane of the second lens, to get the maximum $z_R$ out of the second lens, the telescope configuration of FIG. 4 is used where $d = f_1 + f_2 - \Delta d$, where the relative error $\Delta d$ in setting the interlens distance is small, $\Delta d/d << 1$.

The passage of a laser beam through a telescope is treated to first order in $\Delta d$ in the Bell System Tech. J., 44, supra., with the result (in the notation of FIG. 4, with a subscript 1 referring to the input side of the telescope, and subscript 2 referring to the output side of the telescope)

$$w_2 = w_1 \frac{f_2}{f_1}\left[1 + \frac{\Delta d}{f_1}\left(1 - \frac{s_1}{f_1}\right)\right], \quad (3)$$

and $$(s_2-f_2) = -(s_1-f_1)(f_2/f_1)^2 + \Delta d(f_2/f_1)^2 [(s_1-f_1)^2/f_1^2 - (\pi w_1^2/\lambda f_1)^2]. \quad (3)'$$

Hence to get a spot size magnification of $$w_2/w_1 = 1.26/0.80 = 1.57$$

it is required only that the ratio of output lens focal length to divergence lens focal length $f_2/f_1 = 1.57$, or using $f_2 = 15$ cm as previously determined, $f_1 = 9.6$ cm, since for small $\Delta d$ the magnification given by (3) is essentially independent of the position of the input beam waist. The diameter of the lens 12 need be only large enough to pass the alignment beam. In an experimental version of the present device, the values were $f_1 = 10$ cm, $D_1 = 1.2$ cm; $f_2 = 15$ cm, and $D_2 = 5.0$ cm.

For the output beam divergence to remain small, $\Delta d$ should remain small, which means that the lenses 12 and 24 should be coupled together (as indicated in FIG. 1) as 24 is focused in setting the projection distance of the virtual pivot. On the other hand, occasionally a very small beam diameter is required even though this will be highly divergent in character; an example is in lining up a short, small bore single mode laser. In this case it would be desirable to have an adjustable inter-lens spacing. Also, for coupled lenses the output beam waist position is given by (3) as being essentially at $s_2 = f_2$, since both $s_1 - f_1$ and $\Delta d$ will be small. In some special cases it may be desirable to obtain a projected beam waist at some other location; this also would require a variable inter-lens spacing.

As described above, the angular adjustments of the pivoting mirror change the direction of the output beam in going through the virtual pivot, but do not change the pivot position itself. The focusing of lens 24 varies the longitudinal (on-axis) distance of the virtual pivot from the device, but additional means needs to be provided for centering the virtual pivot in the transverse dimensions (horizontal and vertical) on the entrance aperture of the optical system being aligned. In the preferred embodiment, the alignment laser 10, pivoting mirror 14, folding mirror 22 and lens housing are all mounted together on a common base 6. Transverse positioning of the virtual pivot can then be provided by mounting this base on stacked horizontal and vertical translation stages, or more simply by mounting the base so that it can pivot slightly in the horizontal and vertical planes as indicated by axes 4,5 and adjusting screws 7,8 in FIG. 1. The angular changes of the base required to get a sufficient range in the transverse positioning of the virtual pivot can be made slight enough that these angular changes can be made up in the pivoting mirror angular adjustments.

The advantages of the present invention are:

1. It makes the process of aligning a laser beam to an optical axis non-iterative. The problem of centering the beam in the exit aperture is uncoupled from the problem of centering in the entrance aperture, and the two tasks can be done in a short sequence of straightforward, distinct steps. This greatly reduces the time required to perform the task of alignment.

2. The beam adjustments provided by the invention are more reproducible than those made in the prior art, because in the present invention the problem of going through the entrance aperture is decoupled from adjustments intended to make the beam direction parallel to the direction of the system optical axis. This better reproducibility means that the beam alignment can be made more accurately, since the adjustment giving the most symmetrical sequence of transmitted light patterns can be more accurately found.

3. A beam expansion, to give a less divergent output beam than that available directly from the alignment laser, can be automatically accomplished in the invention, without the use of additional apparatus, by a proper choice of the lens focal length ratio $f_1/f_2$.

A virtual pivoting action of an alignment laser beam can be provided by purely mechanical means, without the use of lenses, by use of curved tracks or ways. This has the disadvantage, compared to the use of lenses, of giving only a single fixed, projection distance of the pivot point away from the device.

The version of the alignment device described herein uses two lenses, where the alignment laser is attached to a common base shared with the lens housing, folding mirror, and pivoting mirror. A multi-lens version is possible, where additional lenses are placed between the laser and the lens 12 (with the added-lens to lens 12 spacing a variable) so as to shape and prepare the output beam waist diameter and waist position to fit the alignment requirements of specialized optical systems. Also, when the transverse pivot position adjustments are made using a vertical and horizontal stage, a laser mounted externally to the device base plate could have its beam threaded into the device using input mirrors which fold the beam path successively along the axes of the two stages, so that the external input beam would be made to strike continually the real pivot point (as the device requires) as the virtual pivot transverse position is adjusted. This version, with or without the auxiliary lenses, would be useful in performing the operation of matching of a laser beam from one optical system into another.

Another potentially useful version of the invention is a straightness and roundness tester for glass (or other reflective) tubing. This version would have auxiliary lenses, placed as above (between the alignment laser and lens 12) which would serve to make in combination a divergence correcting lens of variable focal length. Then by (3), the output beam waist diameter could be varied. The output waist could then be adjusted to approximately equal the tubing internal diameter, and changes in the projected beam direction required to get the cleanest transmitted light pattern, as the projection distance of the virtual pivot was varied down the length of the tubing, would be related to the straightness and roundness of the tubing.

Still another potentially useful version of the invention is as a device for measuring the distance to a remote point. In this version, the output beam is projected through a long focal length output lens 24 (where, for example, $f_2$ might be several meters) and is allowed to strike a remote surface. A dithering or repetitive rocking motion is applied to one of the pivoting mirror angular adjustments by a motor driven mechanism, and the walking spot which results is viewed on the remote surface through a telescope. The focus adjustment of the lens 24 is then varied to make the spot viewed on the remote surface become stationary; once this focus setting is made, the distance to the remote surface would be indicated by the throw distance scale on the device. This arrangement would have the advantage of being able to range to arbitrary surfaces, without the requirement that a retro-mirror be attached to the surface. Alternately, a beam-motion detector could be placed on the remote surface to improve the distance measurement accuracy over that of visual detection alone.

The device in its broader aspects includes thus means 10 for emitting a beam of radiant energy with means such as mirror 14 to allow variation in the direction of the beam and means such as mirror 22 and lens 24 to guide the beam in a path such that it always passes through the virtual pivot point 26 spaced from the emitting means 10 while the direction of the beam through the virtual pivot point changes.

While the device is specifically described with respect to the use of a laser beam, other radiant energy emitting devices, including sources of both visible and invisible radiation, may be used. The application to such sources or modification of the formulas given above would be obvious to persons skilled in the field.

The broader principles of the invention can be achieved if the reflecting mirror 22 is dispensed with; likewise, the pivoting mirror can be omitted if the lens 12 is combined with the laser 10 and the laser is made tiltable. Also a curved mirror has imaging properties so that if the mirror 22 were made curved instead of plane the lens 24 could be dispensed with. In the mounting of the mirror 14, while orthogonal axes are preferred, mounting it to turn about axes at acute angles to each other is possible.

Also, while the device is particularly adapted for alignment of optical systems, it is useful for other purposes including those described above, where it is desirable to have a beam of radiation passing through a fixed point in space remote from the emitting means while the angle of the beam can be varied.

I claim:

1. In combination with a means for emitting a beam of radiant energy, to guide such beam in a path such that the beam always passes through a virtual pivot point in space at a distance from the emitting means, means to vary the direction of the beam passing through such virtual pivot point in at least two orthogonal directions including means defining a real pivot point for said beam along said path, and means for imaging the beam from said real pivot point at said virtual pivot point, and means to vary the distance of the virtual pivot point from the real pivot point.

2. In a combination as claimed in claim 1, said direction varying means comprising a plane pivoting mirror mounted in said path for angular adjustment about transverse intersecting axes with the front surface of the mirror including the point of intersection of said axes, said point constituting the real pivot point, adjustment of the mirror producing the change in the direction of the beam.

3. In a combination as claimed in claim 2, said imaging means being convergent and having an axis, a fixed mirror in said path between the pivoting mirror and the convergent imaging means, the surface of said fixed mirror being substantially parallel to the surface of said pivoting mirror when the beam passes through the axis of the convergent imaging means.

4. In a combination as claimed in claim 3, a frame mounted on lineal movement in the direction of the axis of the convergent imaging means, said frame carrying said imaging means.

5. In a combination as claimed in claim 1, said beam guiding means including said imaging means positioned in said path remote from said emitting means for causing beams from said emitting means to converge to said virtual pivot point.

6. In a combination as claimed in claim 5, said guiding means including divergence correction lens means in said path between said emitting means and said convergent imaging means.

7. In a combination as claimed in claim 1, said beam emitting means comprising a laser.

8. Apparatus for generating a virtual pivoting laser beam which continues to pass substantially through a point in space remote from the generating apparatus (called the virtual pivot point), while the angle of the beam through the virtual pivot point is varied as desired, comprising in combination:
   a. a laser which produces the laser beam;
   b. a first plane mirror (called the pivoting mirror) mounted for angular adjustment about two intersecting axes with the front surface of said mirror containing the point of intersection of the two intersecting axes (called the real pivot point), the emerging beam from the laser striking said pivoting mirror substantially at said real pivot point and being reflected therefrom;
   c. output lens means intersecting the beam reflected from said pivoting mirror, and imaging the laser beam emerging from the real pivot point of said mirror at a remote point, in front of the lens means (called the virtual pivot point), the axis of said output lens means intersecting the real pivot point and
   d. means to vary the distance between the real pivot point and the virtual pivot point.

9. Apparatus as claimed in claim 8, having a second lens means (called the divergence correction lens means) in the path of the laser beam between the laser and said pivoting mirror, the axis of said divergence correction lens means intersecting the real pivot point, the beam emerging from the laser being substantially coincident with the axis of said divergence correction lens means, whereby the center point of the divergence correction lens means and the real pivot point are both intersected by the beam.

10. Apparatus as claimed in claim 9, including means mounting said divergence correction lens means for adjustment along its axis, to produce a beam emerging from the output lens of variable divergence.

11. Apparatus as claimed in claim 8, having a second lens means (called the divergence correction lens means) with its axis coincident with the path of the laser beam between the laser and the pivoting mirror, and means mounting the output lens means and the divergent correction lens means at a distance from each other in the path of the laser beam substantially equal to the sum of the focal lengths of said two lens means.

12. Apparatus as claimed in claim 11, wherein the ratio of the focal length of the divergence correction lens means to the focal length of the output lens means provides an expansion of the beam waist diameter of the beam emerging from the output lens means over the beam waist diameter of the beam as it emerges from the laser.

13. In an apparatus as claimed in claim 11, means mounting said output lens means and said second lens means for movement along their axes with respect to said pivoting mirror while maintaining a constant path distance therebetween.

14. In an apparatus as claimed in claim 13, said mounting means including a frame on which both said lens means are mounted.

15. In an apparatus as claimed in claim 13, means to parallelize the axes of said output lens means and said second lens means.

16. In combination, a plane mirror, means mounting said mirror for adjustment about two perpendicular axes while keeping one point of the reflecting surface of the mirror stationary, the reflecting surface of the mirror being tilted at an angle with respect to the axial plane of said axes, and such point being in said plane, a second plane mirror, means mounting said second mirror with its reflecting surface in a plane tilted with respect to said axial plane at substantially the same angle as the plane of the reflecting surface of the first mirror and in a position to receive from the first mirror the reflection of a beam of radiant energy incident upon said first mirror along a direction substantially perpendicular to said axial plane, first lens means positioned to receive a reflection of said beam from the second mirror for centering the beam at a virtual pivot point on the opposite side of the first lens means from the second mirror, and second lens means for concentrating a beam on said point of the first mirror, whereby during tilting of the first mirror about said axes the virtual pivot point remains fixed while the direction of the beam passing through the virtual pivot point changes.

* * * * *